No. 897,099.
PATENTED AUG. 25, 1908.
P. HAYWARD.
TRANSMISSION GEAR.
APPLICATION FILED MAR. 6, 1908.
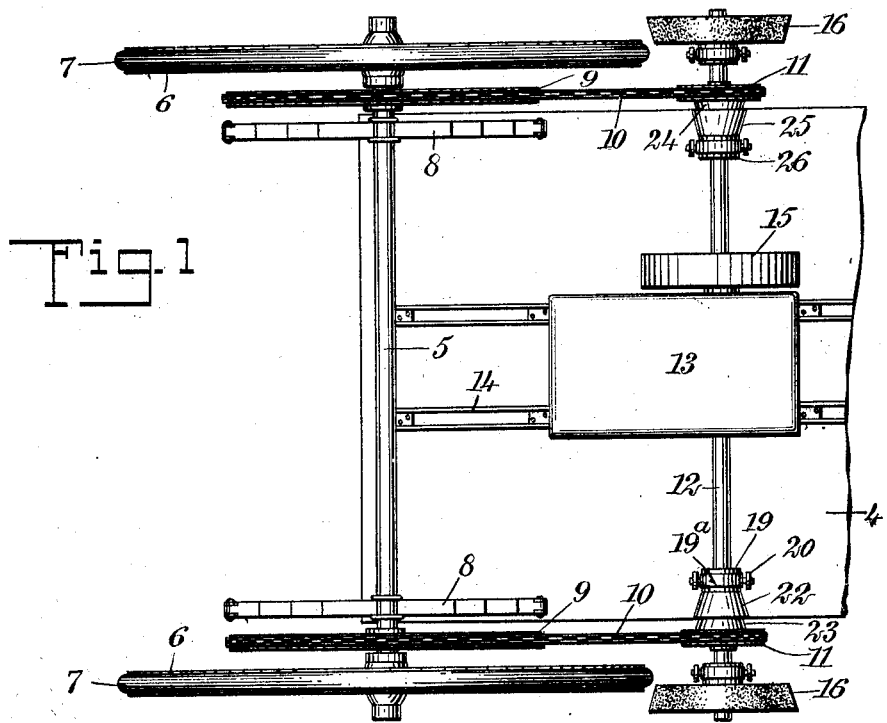
Fig. 1
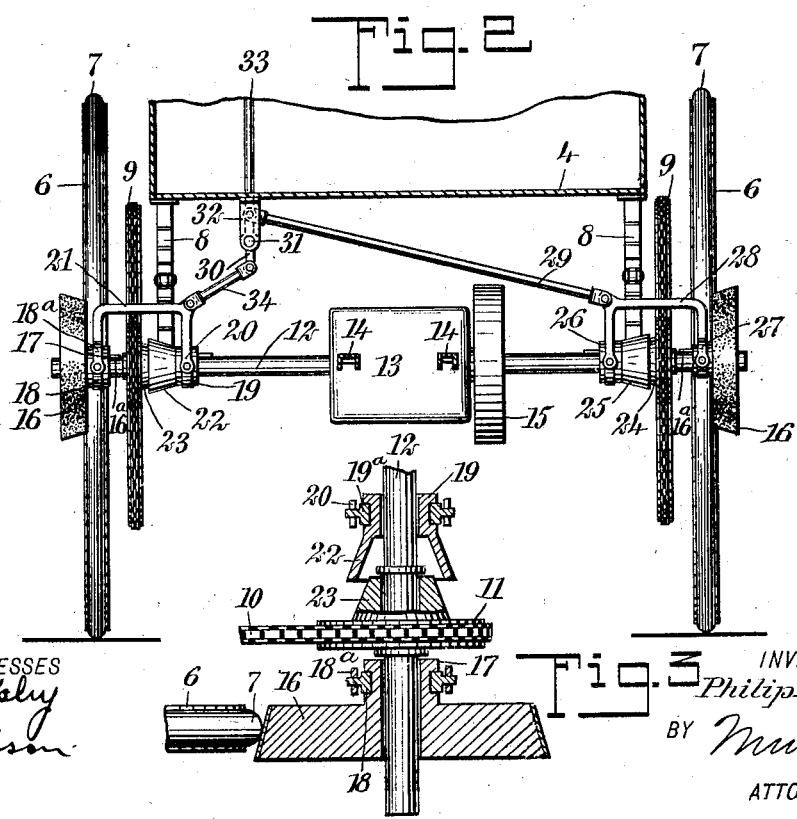
Fig. 2
Fig. 3
WITNESSES
J. A. Brophy
W. Harrison
INVENTOR
Philip Hayward
BY Munn & Co
ATTORNEYS.

_UNITED STATES PATENT OFFICE._

PHILIP HAYWARD, OF HANGING ROCK, OHIO.

TRANSMISSION-GEAR.

No. 897,099.    Specification of Letters Patent.    Patented Aug. 25, 1908.

Application filed March 6, 1908. Serial No. 419,445.

*To all whom it may concern:*

Be it known that I, PHILIP HAYWARD, a citizen of the United States, and a resident of Hanging Rock, in the county of Lawrence and State of Ohio, have invented a new and Improved Transmission-Gear, of which the following is a full, clear, and exact description.

My invention relates to transmission gears, my more particular purpose being to provide a construction for general use.

My invention further relates to a form of transmission gear especially suitable for road vehicles, and comprising means for reversing the motion of a revoluble driven member.

Reference is to be had to the accompanying drawings forming a part of this specification, in which similar characters of reference indicate corresponding parts in all the figures.

Figure 1 is a fragmentary inverted plan showing the under side of a road vehicle equipped with my invention; this view further showing how the power is applied to a driving shaft, thence transmitted to the driven shaft, and further showing how the power may be shifted from the driving shaft to the contact surfaces of the wheels; Fig. 2 is a vertical cross section through the body of the vehicle, showing the reversing mechanism comprising clutches for disconnecting the friction wheels with the peripheries of the road wheels whenever the clutches are thrown out of action, in order to transmit the power directly to the road wheels; and Fig. 3 is a fragmentary detail showing in section a portion of the reversing mechanism for shifting the power from the gearing directly to the peripheries of the road wheels, and vice versa.

The vehicle body is shown at 4, the rear axle at 5, and the road wheels at 6, the latter being shown as provided with tires 7. The vehicle springs 8 are disposed intermediate the body of the vehicle and the axle 5. Sprocket wheels 9 are mounted so as to turn with the road wheels, and are geared by sprocket chains 10 with sprocket pinions 11, so as to transmit power from the latter to the road wheels. A driving shaft 12 extends through a prime mover 13, such as an internal combustion engine, and is turned thereby. The prime mover is suspended upon angle irons 14 from the under side of the vehicle body.

Mounted upon the driving shaft 12 is a fly wheel 15. The ends of the driving shaft are provided with friction disks 16 of frusto-conical form, mounted thereupon by aid of splines 16ª, and capable of sliding upon the shaft 12 in the general direction of the length thereof, but turning with the shaft at all times. The friction disks 16 are provided with hubs 17 on which fit collars 18 for the purpose of moving each friction disk 16 in the general direction of the shaft 12. At a point adjacent to a sprocket pinion 11, at one side of the vehicle, is a fork 18ª engaging the adjacent collar 18. Immediately inside said sprocket pinion 11, is a clutch member 19 splined upon the shaft 12 and having a collar 19ª, operated by a fork 20, the latter being connected with the fork 18ª by a yoke 21. The clutch member 19 is provided with a frusto-conical portion 22 which fits upon another frusto-conical portion 23, the latter being revoluble relatively to the driving shaft 12, but having no movement in the general direction of the axis of the same. The sprocket pinion 11 is rigid in relation to the portion 23, so as to turn therewith.

Upon the opposite side of the vehicle, immediately inside the other sprocket pinion 11, a frusto-conical clutch member 24 is mounted upon the driving shaft 12, and is revoluble relatively to said shaft, and said clutch member is mated by a hollow frusto-conical clutch member 25, carried by a clutch member 26, splined upon the driving shaft 12 so as to turn therewith and yet be capable of a longitudinal sliding movement relatively to the general direction of the axis thereof. A fork 27 controls the immediately adjacent friction disk 16, and is connected with a yoke 28. To this yoke is pivoted a rod 29 which extends nearly across the vehicle and is pivoted to a lever 30, mounted upon a stub shaft 31 carried by a bracket 32, depending from the under surface of the vehicle body. A hand lever 33 is connected rigidly with the stub shaft 31 for the purpose of turning the latter. A rod 34 connects the lower end of the lever 30 with the yoke 21. By turning the hand lever 33 by hand the clutch members 22, 25, are drawn toward each other and out of engagement with the respective clutch members 23, 24. The friction disks 16 normally out of engagement with the wheels 6, are by the same movement of the hand lever 33 drawn toward each other and into engagement with the wheels 6. This occurs when the hand lever is moved to the left according to Fig. 2. When, however, this hand lever is moved to the right according to this figure, the friction disks 16 are moved outwardly and thus disconnected from the wheels 6, the same movement causing the clutch members 22, 25, to move into engagement with the clutch members 23, 24.

My invention is used as follows: We will suppose that the parts occupy their normal positions as indicated in Fig. 1, and that power is being exerted by the prime mover 13. The driving shaft is thus turned and by aid of the sprocket pinions 11, sprocket chains 10, and sprocket wheels 9, transmits motion to the road wheels 6, so as to propel the vehicle forward. If now the operator moves the hand lever 33 to a suitable extent to the left, he disengages the clutch members 22, 25 from engagement with the clutch members 23, 24, and draws the friction disks 16 toward the wheels 6, and carrying the movement of the hand lever still further to the left according to Fig. 2, the friction disks 16 are drawn firmly into engagement with the wheels 6, the clutch members 22, 25 being still disengaged, as just described. The result is that when the hand lever 33 occupies its extreme position to the left according to Fig. 2, the power from the driving shaft is applied through the friction disks 16 directly to the wheels 6, so as to turn the wheels by power applied to their peripheries, whereas when the lever 33 occupies its extreme position to the right according to Fig. 2, the power is applied from the prime mover 13 through the driving shaft 12, the gearing consisting of sprocket pinions 11, sprocket chains 10, and sprocket wheels 9, to the road wheels 6. The direction of rotation of the wheels is in the instance last mentioned, different from what takes place when the power is applied through the friction disks 16 to the peripheries of the wheels. The operator is thus enabled to drive the vehicle forward or backward, or to render the driving gear idle, as desired.

Having thus described my invention, I claim as new and desire to secure by Letters Patent,—

1. In a transmission gear, the combination of a driving shaft, a driven shaft, gearing for connecting said driving shaft in operative relation to said driven shaft, a clutch for connecting said gearing with said driving shaft and disconnecting the same therefrom, a revoluble member mounted upon said driven shaft, a friction disk mounted upon said driving shaft and adapted to intermittently engage such revoluble member upon said driven shaft for the purpose of applying power directly thereto, and means controllable at will for throwing said clutch and friction disk into action alternately.

2. In a transmission gear, the combination of a driven shaft, a driving shaft bearing a fixed relation to the driven shaft, gearing for connecting said shafts together so as to enable said driven shaft to turn in a given direction, other gearing for connecting said shafts together so as to enable said driven shaft to turn in an opposite direction, and means controllable at will for throwing into action either gearing, as desired.

3. The combination of a driving shaft, a driven shaft, sprocket connections for enabling said driving shaft to actuate said driven shaft, a clutch for connecting said driving shaft with said sprocket connections and for disconnecting the same therefrom, a revoluble member mounted upon said driven shaft, a gear member mounted upon said driving shaft and adapted to engage and disengage said revoluble member upon said driven shaft, and means connected with said last-mentioned gear member and with said clutch for the purpose of actuating the same in unison.

4. The combination of a vehicle body provided with a road wheel, a sprocket wheel in operative relation to said road wheel for the purpose of turning the latter, a sprocket chain connected with said sprocket wheel, a driving shaft, a sprocket member mounted thereupon and engaging said sprocket chain, a clutch for connecting said driving shaft to said sprocket member, a friction disk mounted upon said driving shaft and adapted to engage said road wheel directly, and means controllable at will for disconnecting said clutch and for forcing said friction disk into engagement with said road wheel.

5. The combination of a vehicle body, a road wheel for supporting the same, a set of gearing for turning said road wheel in one direction, a gearing member for engaging said road wheel directly in order to turn it in an opposite direction, a driving shaft bearing a fixed relation to the rear wheel, and means controllable at will for disconnecting said set of gearing and for forcing said gearing member into engagement with said road wheel so as to reverse the direction of travel of said road wheel.

In testimony whereof I have signed my name to this specification in the presence of two subscribing witnesses.

PHILIP HAYWARD.

Witnesses:
W. M. JEFFERY,
MASON P. HERRON.